US00RE40126E

(19) United States
(12) Reissued Patent
Rajewski

(10) Patent Number: US RE40,126 E
(45) Date of Reissued Patent: Mar. 4, 2008

(54) MOBILE SHREDDING SYSTEM

(76) Inventor: David E. Rajewski, 909 W. Paradise Rd., Spokane, WA (US) 99224

(21) Appl. No.: 11/007,814

(22) Filed: Dec. 8, 2004

Related U.S. Patent Documents

Reissue of:
(64) Patent No.: 6,491,245
Issued: Dec. 10, 2002
Appl. No.: 09/543,374
Filed: Apr. 5, 2000

(51) Int. Cl.
*B02C 18/22* (2006.01)

(52) U.S. Cl. ..... 241/223
(58) Field of Classification Search ..... 241/223, 241/222, 224, 101.5; 198/623, 622, 455
See application file for complete search history.

(56) References Cited

U.S. PATENT DOCUMENTS

| | | | | | |
|---|---|---|---|---|---|
| 2,961,977 | A | | 11/1960 | Coleman | |
| 3,224,554 | A | * | 12/1965 | Moulder et al. | 198/392 |
| 3,513,962 | A | * | 5/1970 | London et al. | 198/455 |
| 3,831,737 | A | * | 8/1974 | Joyce | 198/444 |
| 3,903,816 | A | * | 9/1975 | Brem | 111/130 |
| 3,997,942 | A | * | 12/1976 | Buck et al. | 19/296 |
| 4,060,167 | A | * | 11/1977 | Smith | 198/622 |
| 4,763,846 | A | | 8/1988 | High, Jr. et al. | |
| 4,786,003 | A | | 11/1988 | Johnson | |
| 4,852,815 | A | | 8/1989 | Ginnotti | |
| 5,156,346 | A | | 10/1992 | Portz | |
| 5,230,475 | A | * | 7/1993 | Gerner | 241/34 |
| 5,265,811 | A | | 11/1993 | Willibald | |
| 5,395,061 | A | | 3/1995 | Merklinger | |
| 5,465,914 | A | | 11/1995 | Faccia | |
| 5,542,617 | A | | 8/1996 | Rajewski | |
| 5,642,765 | A | | 7/1997 | Brown | |
| 5,676,320 | A | | 10/1997 | Merklinger | |
| 5,842,652 | A | | 12/1998 | Warsingr et al. | |

* cited by examiner

*Primary Examiner*—Mark Rosenbaum
(74) *Attorney, Agent, or Firm*—Wells St. John P.S.

(57) ABSTRACT

Disclosed is a mobile shredding and material handling and feed system, preferably for use in the handling and shredding of paper and other office related feedstock. An embodiment of the system on the input side utilizes an input hopper, a first conveyor, a feed aperture, and a second conveyor which moves excess feedstock away from the entry to the shredder feed aperture to avoid jamming the feed aperture. An embodiment of the invention on the output side utilizes a compactor, preferably one or more augers, to compact the shredded material exiting the shredder, and moving said compacted shredded material to the discharge or system output. An embodiment of this material handling and feed system also applies for balers.

16 Claims, 6 Drawing Sheets

MOBILE SHREDDING SYSTEM

Matter enclosed in heavy brackets [ ] appears in the original patent but forms no part of this reissue specification; matter printed in italics indicates the additions made by reissue.

TECHNICAL FIELD

This invention pertains to a mobile shredding and material handling system, preferably for use in the handling and shredding of paper and other office related feedstock.

BACKGROUND OF THE INVENTION

Mobile paper shredders have been used for many years to shred paper and other office related feedstock. One example of such a prior mobile paper shredder is U.S. Pat. No. 5,542,617, issued to David E. Rajewski on Aug. 6, 1996, which is hereby incorporated by this reference into this application as though fully set forth herein.

An important part of any paper shredding operation is the material handling aspects, i.e., how the feedstock is received, controlled and delivered to the shredder, and also how it is discharged and handled after it is shredded. This becomes more important in mobile shredding applications where space and other time limitations affect operations more.

While there are still may mobile shredding units which utilize a hand feed by the operator, there are also automated feed units such as that disclosed in U.S. Pat. No. 5,542,617, wherein an effective lift system is used to provide the feedstock to the input hopper.

If feedstock is fed to the shredder too fast, the shredder tends to jam and breakdown, whereas if it is fed too slow, the shredding process takes an unnecessarily long time. On the output side, if the shredded material exiting the shredder is inefficiently handled while being moved to the storage area, it can result in delays in the operations and possibly clogging of the shredder.

Since there is limited storage area in mobile shredders, the more the shredded material may be compacted while it is being moved to the storage area, the more efficient the mobile operation will be and the higher capacity it will have for a given sized truck or storage area.

It is one object of this invention to provide a more efficient and effective feedstock and shredded material handling system for use in connection with a high speed shredder, from where the feedstock is received in the hopper, to where it stored in the storage compartment of the vehicle.

After exiting the shredder and being placed in the storage area, the shredded material must then be removed from the truck or other storage area and thereafter handled. In many situations, the shredded material is preferably placed in a baler and thereby compacted into bales of resale. The baler feedstock, i.e. the shredded material, has similar demands to the shredder application, i.e. efficient input, compacting and efficient delivery of the output material to the baler compartment.

The feedstock and shredded material handling system provided by this invention (without the shredder) has the additional feature of facilitating the efficient handling of shredded material as baler feedstock, into a baler compartment, such as a paper baling apparatus, as is more fully described below.

BRIEF DESCRIPTION OF THE DRAWINGS

Preferred embodiments of the invention are described below with reference to the accompanying drawings, which are briefly described below.

FIG. 7 is a side elevation schematic view of the baler feed system embodiment of this invention, and is similar to FIG. 3 for the shredder embodiment, with the shredder removed, as is disclosed more fully below.

DETAILED DESCRIPTION OF THE PREFERRED EMBODIMENTS

Many of the fastening, connection, manufacturing and other means and components utilized in this invention are widely known and used in the field of the invention described, and their exact nature or type is not necessary for an understanding and use of the invention by a person skilled in the art or science; therefore, they will not be discussed in significant detail. Furthermore, the various components shown or described herein for any specific application of this invention can be varied or altered as anticipated by this invention and the practice of a specific application or embodiment of any element may already be widely known or used in the art or by persons skilled in the art or science; therefore, each will not be discussed in significant detail.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

Figure 1:
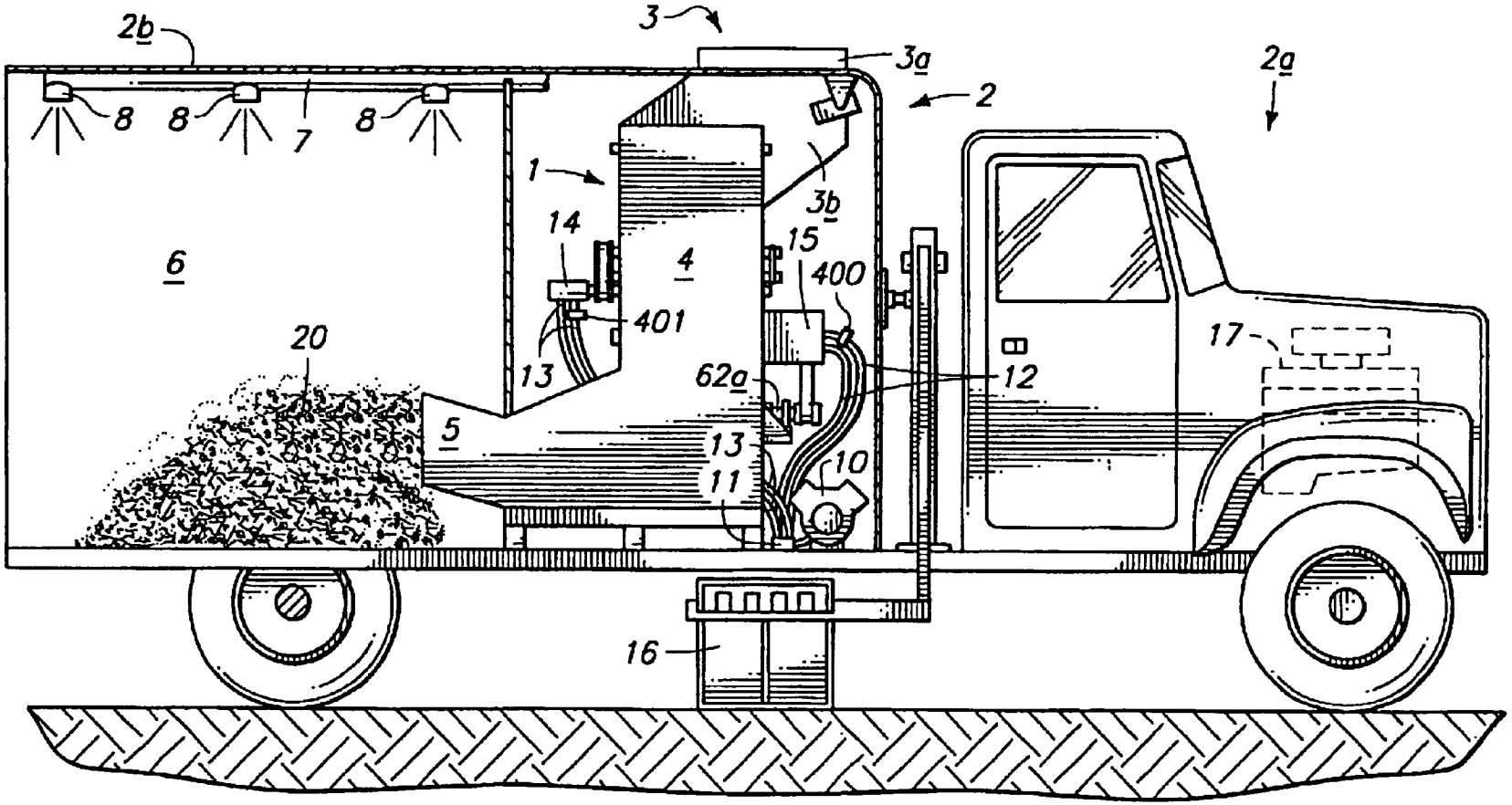
FIG. 1 is a side elevation view showing a schematic of one embodiment of a feedback and shredded material handling system as contemplated by this invention.

FIG. 1 illustrates a mobile shredding system mounted on and within a truck 2, the trunk 2 including a cab portion 2a with an operator compartment therein, and a truck rear enclosure 2b. FIG. 1 also illustrates a vehicle or trunk engine 17.

FIG. 1 illustrates a mobile shredding system with an input hopper 3 with an input end 3a and an output end 3b. Paper and other feedstock material is fed into the input hopper in any one of a number known of ways, with no one in particular being required to practice this invention. The preferred way to load the input hopper 3 is utilizing the lifting arm system disclosed in U.S. Pat. No. 5,542,617, issued Aug. 6, 1996 to David E. Rajewski, which is incorporated herein by reference. The lifter is shown in FIG. 1 with a frame 16 in which a feedstock container may be placed and then lifted to place the feedstock in input hopper 3. The preferred lifting system is not described in more detail herein due to the incorporation of U.S. Pat. No. 5,542,617 by reference.

The term "input hopper" as used herein is broader than its typical meaning, and without limitation, includes hoppers and any other temporary storage or containment structure for receiving the feedstock material to be shredded. The hopper may then directly or indirectly provide the feedstock material to the feedstock handling system for feeding to the shredder.

FIG. 1 illustrates the shredding system 1 with housing 4 and system output 5. Material is placed in the input end 3a of input hopper 3 and is moved to output end 3b of the input hopper for delivery to the shredder. Shredded material 20 exiting the system output 5 is moved into storage area 6 within the truck rear enclosure 2b.

It will be noted that the storage area may, but need not have a dust control system which is comprised of fluid nozzles 8 and fluid conduit 7. The dust control system can be activated to reduce and control the level of dust in the storage area which in turn controls the level of dust when the storage area is emptied.

In order to provide for a mobile shredding system in which the shredder may be operated while the truck or vehicle is being driven, this mobile shredding system preferably includes shredder engine 10 separate from the vehicle or truck engine, hydraulic pump 11, hydraulic lines 12 and 13, and hydraulic motors or drivers 14 and 15 for providing power to the various components of the shredding system, as will be described more fully below. The shredder engine 10 would include all the ancillary items necessary to operate it, such as a gas tank, an ignition system, and the like.

It should be noted that while the shredding system in FIG. 1 is shown with an independent shredder engine 10, an independent engine is not required to practice embodiments of this invention, but instead other ways may be employed, such as power take-off mechanisms which are readily known in the art (for stationary shredding). Further, a hydraulic pump could also be configured relative to the vehicle engine to received rotation from the flywheel, or otherwise operatively connected to the vehicle engine. This may be disadvantageous to the extent the rotation provided varies with the revolutions per minute of the vehicle engine instead of being constant as an independent shredder engine may be.

The shredder engine 10 may be a diesel or a gas engine, as no one particular type is required to practice this invention. The hydraulic components such as the hydraulic pump 11, hydraulic lines 12 & 13, and the hydraulic drives 14 and 15, are also well known in the art. Alternatively, an engine could drive a generator which would provide electricity to individual motors or drives for the various applications required by this invention, as described more fully below. An example of a preferred engine is a Cummins diesel engine, 3.3 liter 85 horsepower. Exemplary hydraulic motors/drives are those such as Eaton Hydraulic motor 101-1016-008, and a hydraulic pump such as Permco pump P3000 3 section.

FIG. 1 further illustrates pressure sensor 400 in hydraulic line 12 which measures the hydraulic pressure to the hydraulic drive 15, and hydraulic valve 401 in hydraulic line 13 (which drives the conveyors and the feed drum. The combination of the pressure sensor 400 and the hydraulic valve 401 act as a governing system such that when high pressures are sensed in the shredder, the pressure sensor 400 detects the higher pressure in the hydraulic line 12 and signals to the hydraulic valve 401 to stop the flow of hydraulic fluid to hydraulic drive 14. Stopping the flow of hydraulic fluid to hydraulic drive 14 stops the first conveyor, the second conveyor and the feed drum, thereby causing the feeding to the shredder to be stopped when a pressure over predetermined pressure is reached. This may occur if too much feedstock or excessively large or dense pieces of feedstock are moving through the feeder. This results in fewer equipment overloads, jams and breakdowns.

Figure 2:
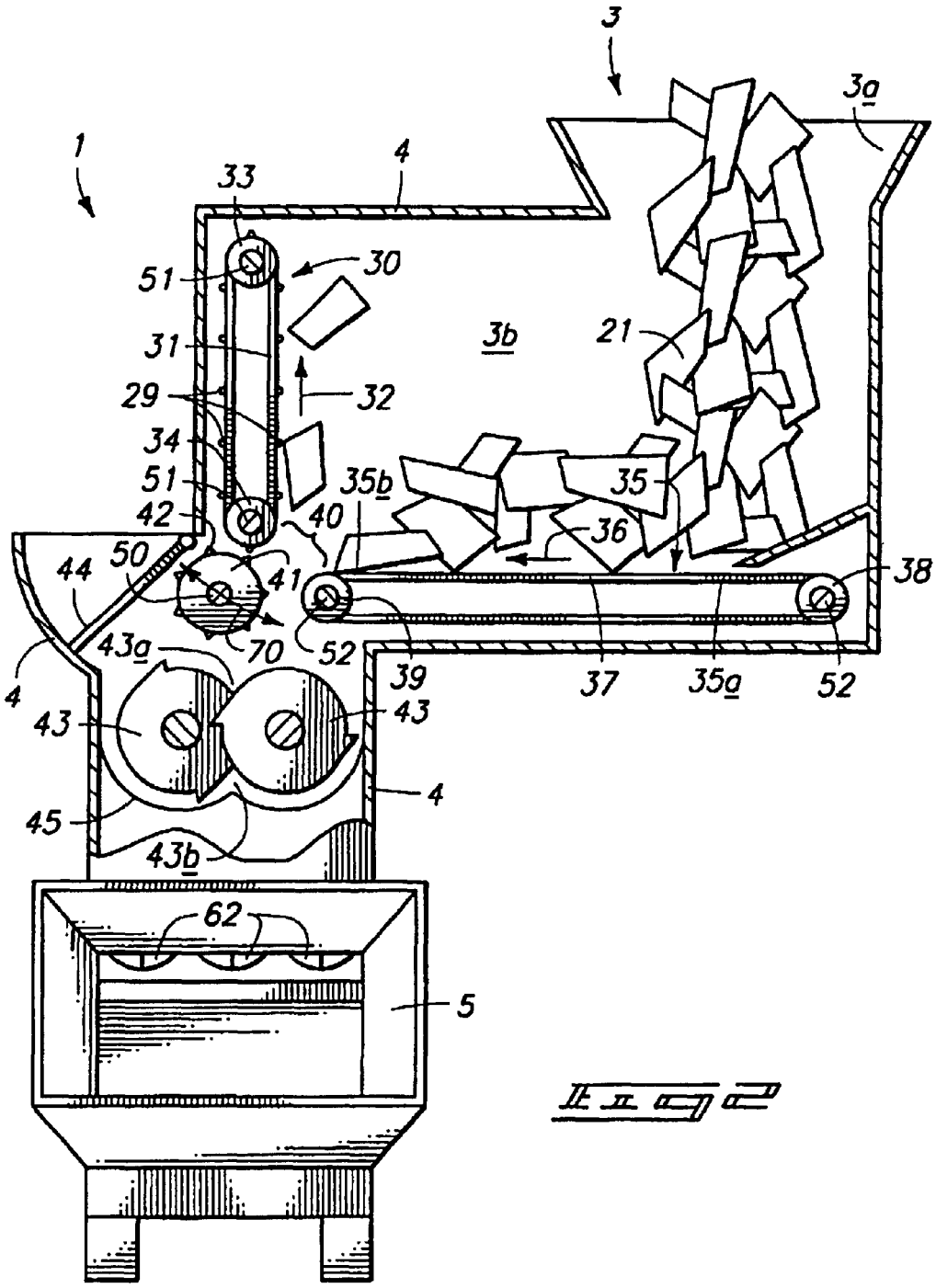
FIG. 2 is a rear elevation schematic view of the embodiment of the feedstock and shredded material handling system shown in FIG. 1.

FIG. 2 shows a rear elevation view of one embodiment of a shredding system 1 as contemplated by this invention, and also as illustrated in FIG. 1, illustrating the input hopper 3, the input end 3a of input hopper 3, the output end 3b of input hopper 3, and first conveyor 35 with first conveyor surface 37 moving in conveyor direction 36. First conveyor 35 is on conveyor drivers or supports 38 and 39 which are rotated about their axes 52.

FIG. 2 further illustrates second conveyor 30, second conveyor surface 31 moving in conveyor direction 32 (upwardly in this illustration), supported by conveyor supports 33 and 34 and rotated by axes 51. It will be appreciated by those skilled in the art that while the second conveyor 30 is shown vertically oriented, there are other angles of greater or less than ninety degrees to the first conveyor 35 at which the second conveyor 30 may be oriented to accomplish the feed control function it serves, all within the contemplation of this invention and depending on various factors such as the desired feed rate, the feed material, and others. Second conveyor 30 preferably has nubs 29 on the surface to assist in the gripping and moving of the feedstock.

It will also be noted by those of ordinary skill in the art that other types of conveyors or conveyor equipment may be used as the second conveyor, with the key being a moving surface spaced apart from the first conveyor and which moves excess feedstock from around the feed aperture. An example of a different conveyor of the excess feedstock at the feed aperture is a Feeder Beater Drum as produced and available from Cash Hardware Company, possibly with fingers, shields, heads and sprocket, and which are intended to be within the definition of conveyor. These may be similar to the feed drum, only with the finger and shield mechanism preferably included.

The feedstock 21 being fed into the hopper 3 is fed or output to first conveyor 35 where it is moved in conveyor direction 36 toward the feed aperture 40. In many situations there will be more material to shred than can easily or efficiently be passed through feed aperture 40 and the excess feedstock not passing through feed aperture 40 will come into contact with second conveyor surface 31 of second conveyor 30 and be pushed or pulled upwardly in conveyor direction 32. This has the effect of lifting the feedstock material away from feed aperture 40, and prevents jam through feed aperture 40, and further allows for more efficient and effective metering or feeding of feedstock through feed aperture 40. The feedstock 21 coming in contact with second conveyor surface 31 is lifted and eventually falls back toward feed aperture 40 and will eventually be fed through it at a time when it can more readily be received through feed aperture 40.

Feedstock passing through feed aperture 40 then encounters feed drum 41 rotating on shaft or feed drum axis 50. It is preferred but not required that feed drum 41 include feed projections 42 which assist in grabbing or engaging feedstock passing through to urge it to continue to flow toward shredder 43. Feed drum 41 is rotated by hydraulic drive 14 in the manner shown in FIG. 4, and more fully described below. A specific type or kind of shredder 43 is not required to practice this invention, however, in the high speed, high volume application of this invention, a hammermill type may be preferred, whereas in the lower volume applications, a shear type of shredder may be preferred. FIG. 2 illustrates a shear type of shredder.

As is better illustrated in later figures and more fully described below, feed drum 41 is bias mounted on a pivot arm such that it may move in the direction indicated by direction arrow 70, the feed drum 41 being biased in the downward direction, as is described more fully below. Allowing movement of feed drum 41 allows for larger pieces of feedstock to pass through to the shredders without clogging or jamming the system in and around feed drum 41 and feed aperture 40, while continuing to feed or provide feedstock 21 to the shredder 43.

The shredder 43 may be any one of a number of different types of shredders within the contemplation of this invention, as no one in particular is required to practice this invention.

Figure 3:
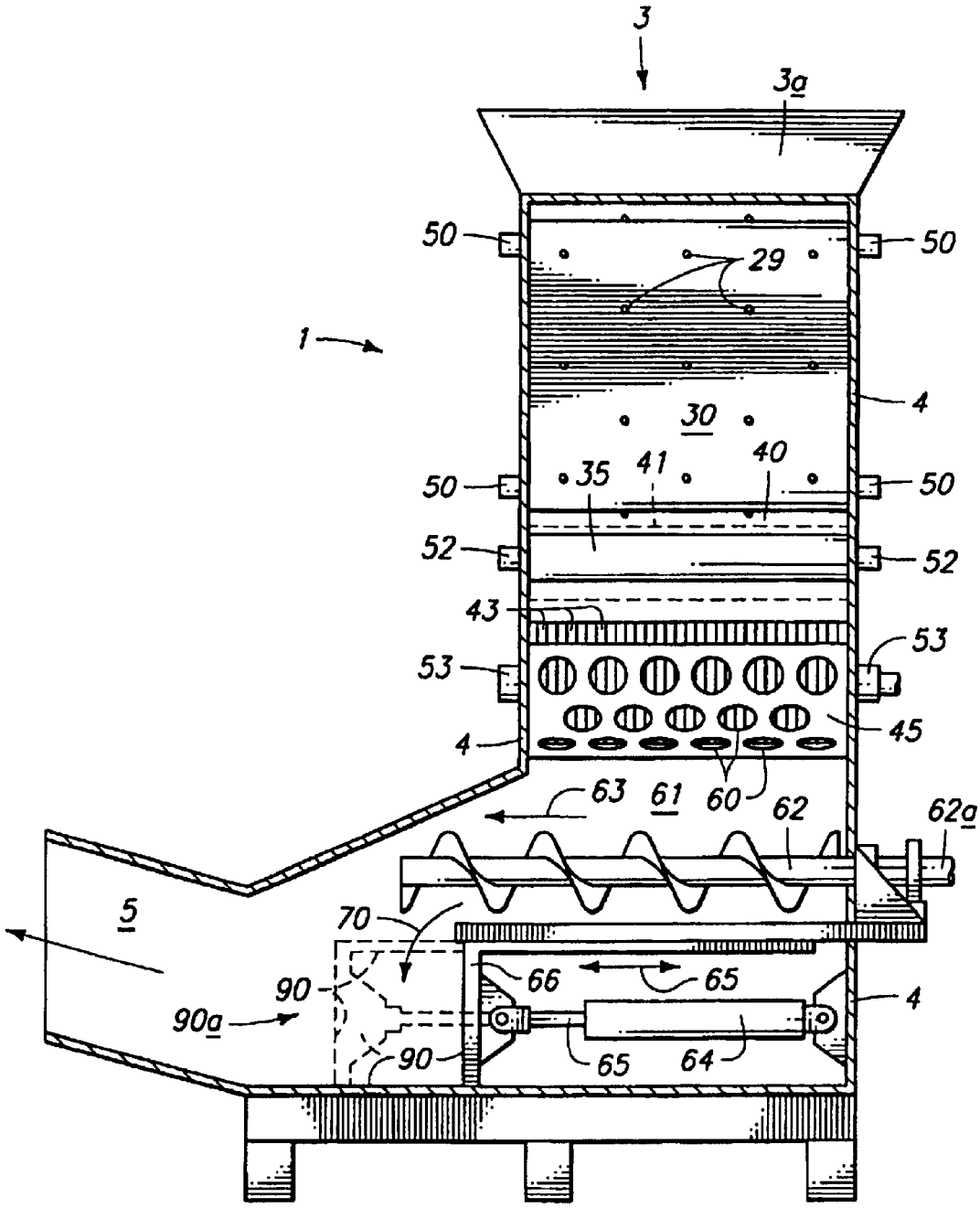
FIG. 3 is a side elevation schematic view of the embodiment of the feedstock and shredded material handling system shown in FIG. 1.

FIG. 2 further illustrates shredder input 43a, shredder output 43b, shredder screen 45 around shredder 43 and system output 5, which is a discharge hopper. FIG. 2 still further shows three augers 62 which act as compactors and compact the shredded material as it is received from the shredder output 43b and before it is fed to the system output 5. FIG. 3 more fully illustrates a side view of one of the three preferred augers. There is typically a large mass of shredded material filling the area around augers 62, which allows for efficient compacting of the shredded material exiting the shredder 43.

FIG. 2 also illustrates how the feed drum 41, which rotates clockwise, and the first conveyor 37, which rotates counter-clockwise, provide the feedstock to the shredder in a more usable way since the combination tend to feed wider or longer pieces of feedstock lengthwise into the shredder 43 for shredding. Under prior systems, wider or longer pieces of feedstock may be fed onto the shredder 43 such that the longest or widest section is oriented more horizontally, sometimes causing the feedstock pieces to dance or remain on top of the shredder 43 without being drawn through and shredded. This more efficient feeding and orienting of the feedstock contributes to the efficiency and effectiveness of the feed system.

FIG. 3 is a side elevation view of the shredder system 1, illustrating input hopper 3 with input end 3a, housing 4, second conveyor axes 50, shredder 43, first conveyor 35, shredder screen 45, shredder axis or shaft 53, and shredder screen apertures 60.

The shredder screen output 61 provides or delivers material to augers 62, which are disposed to receive the shredded material. Augers 62 are rotated by auger shafts 62a and move the shredded material in direction 63 and causes it to further move in direction 70. The material exiting the shredder typically includes a substantial amount of air and is very fluffy. Augers 62 serve to compact or pre-pack the shredded material before it is dropped into the area of the ram to be pushed through system output 5, i.e. to condense it or reduce the quantity of air in the volume of shredded material.

This pre-packing or compaction combined with the action of the ram 66 allows for more material to be moved through and handled by the shredding system. Hydraulic cylinder 64 pushes hydraulic cylinder shaft 65 which is attached to ram 66 to move material received from auger 62 out system output 5. Hydraulic cylinder 64 is mounted to housing 4 and provides the movement indicated by the arrows on a continuous basis during operation.

The shredded material received from augers 62 is received in discharge area 90, and ram 66 pushes the shredded material through discharge area outlet 90a. As more material passes through and is pushed through discharge area outlet 90a, it pushes the material through system output 5 and into storage area 6 with the truck enclosure (as shown more fully in FIG. 1).

The system output chute 5 can place or deliver shredded material into shredded material storage area 6 in any one of a number of different ways but all within the contemplation of this invention. One such way, a preferred way, is through the utilization of a movable wall system as disclosed in U.S. Pat. No. 5,542,617, previously incorporated herein by reference.

Figure 4:
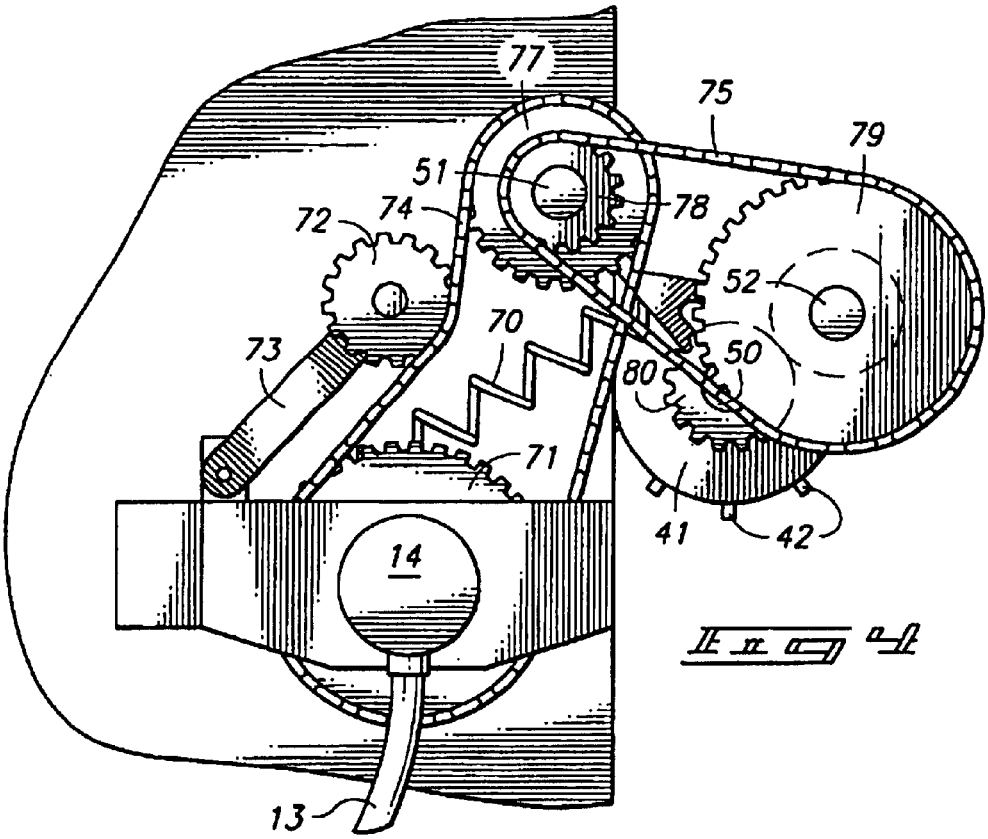
FIG. 4 is a top detail view of part the gear and drive train of the shredder and feed drum shown in the embodiment of this invention also shown in FIG. 1.

FIG. 4 illustrates an example of an embodiment drive system for part of the shredding system disclosed herein and illustrates hydraulic drive 14, hydraulic line 13, drive gear 71, first drive chain 74, second drive chain 75, and tension gear 72 rotatably mounted on arm 73 to provide tension in first drive chain 74.

First drive chain 74 provides rotation to second conveyor drive gear 77 through second conveyor axis 51. Second drive gear 78 is operably connected to second drive chain 75 to provide rotation to third drive gear 79, which provides rotational drive to feed drum 41 via fourth drive gear 80.

FIG. 4 also illustrates the projections 42 on feed drum 41 and the feed drum spring 70 which provides tension or biasing downward on feed drum 41 to allow for travel and direction 70 as more fully shown in FIG. 2.

While there are many different drive gearing and other arrangements which may be used to provide the rotation to the feed drum 41, the conveyor and the shredder 43, no one in particular is required to practice the invention. The preferred method as shown in FIG. 4 is merely one example within the contemplation of this invention.

Figure 5:
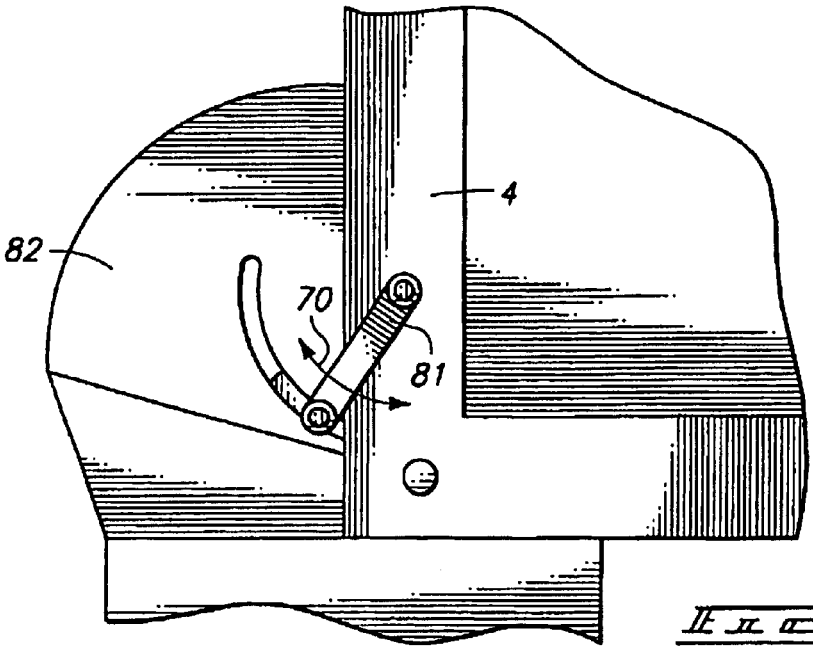
FIG. 5 is a rear elevation view of the feed drum link arm and a shredder cover, of the embodiment of this invention shown in FIG. 1.

FIG. 5 shows shredding system housing 4 and link arm 81, which is operably attached to feed drum 41 to allow for the feed drum 41 to travel in direction 70 in response to feedstock being fed through feed aperture 40. Shredder door 44, shown in FIG. 2, allows access to the shredding area, and shredder cover 82 is removable and provides a housing for the shredding area. Hydraulic drive 15 in FIG. 1 provides rotational drive to shredder 43 and to auger shaft 62a, as shown in FIG. 1 and as would be obvious to those of ordinary skill in the art.

Figure 6:
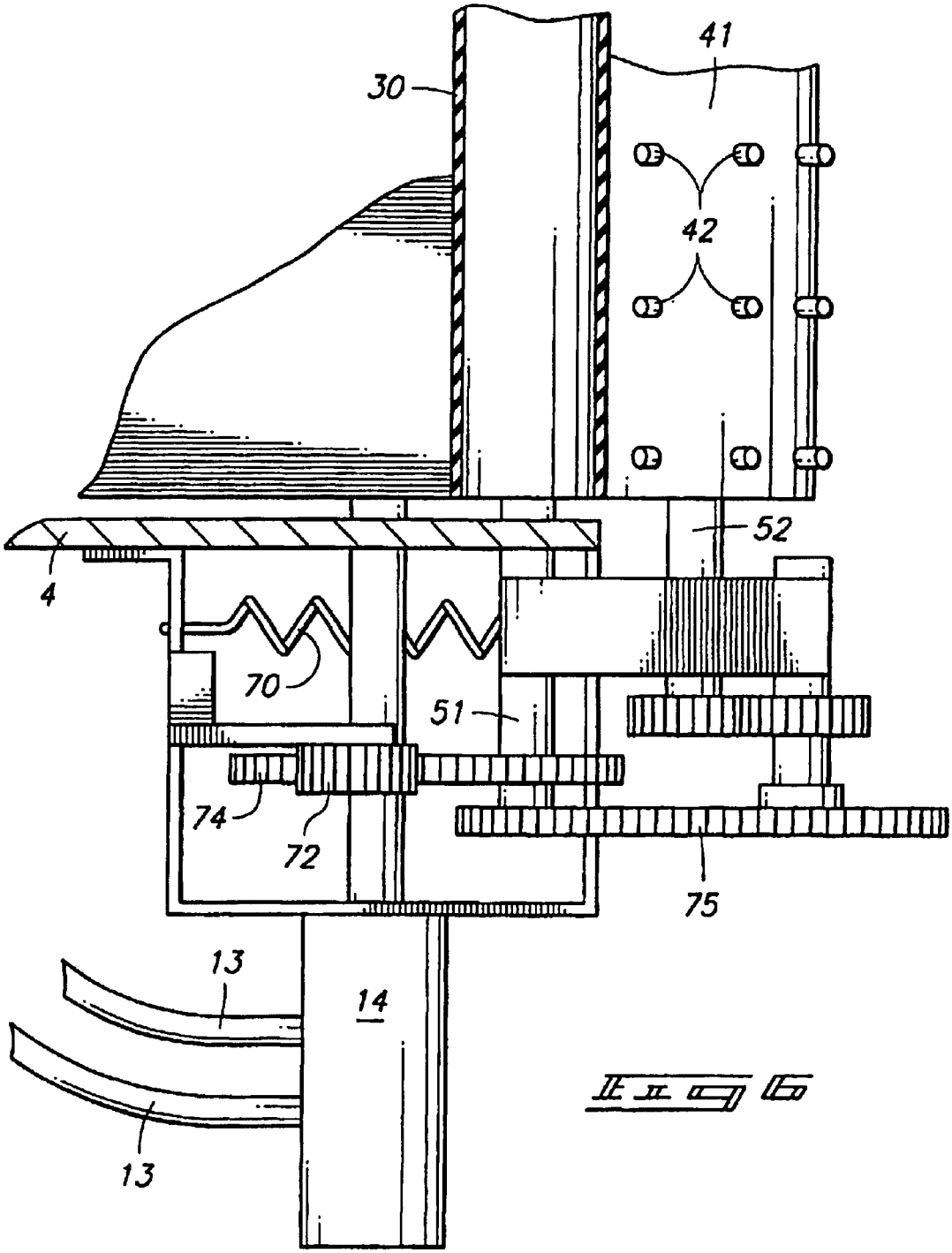
FIG. 6 is a top detail view of part the gear and drive train of the shredder and feed drum shown in the embodiment of this invention also shown in FIG. 4.
Figure 11:
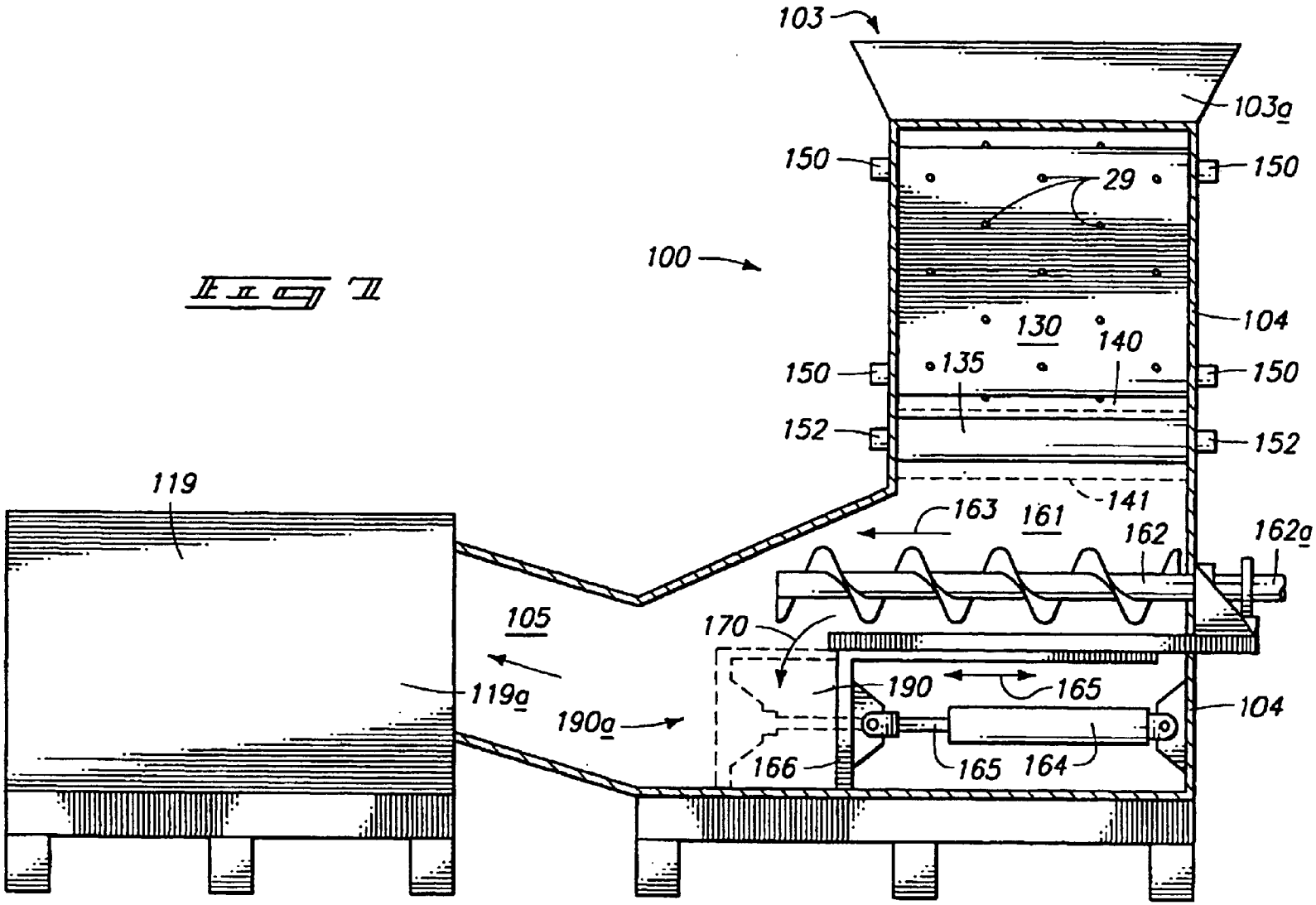

FIG. 6 is a top view of the conveyor and feed drum drive mechanism shown in FIG. 4, illustrating hydraulic drive 14, hydraulic lines 13, first drive chain 74, feed drum spring 70, second conveyor axis 51, feed drum axis or shaft 52, feed drum 41, feed drum projections 42, second conveyor 30, second drive chain 75, and tension gear 72.

FIG. 7 is a side elevation view of the embodiment of the balestock handling system 100 which may be used to provided compacted balestock to a baler. FIG. 7 illustrates input hopper 103 with input end 103a, housing 104, second conveyor axes 150, first conveyor 135.

The two conveyors deliver balestock through feed aperture 140, and at the exit end of feed aperture 140 is feed drum 141, which provides or delivers balestock material to augers 162, which are disposed to receive the balestock material. Augers 162 are rotated by auger shafts 162a and move the balestock material in direction 163 and causes it to further move in direction 170. The material typically includes a substantial amount of air and is very fluffy. Augers 12 serve to compact or pre-pack the balestock material before it is dropped into the discharge area of the ram 166 to be pushed through system output 105, i.e. to condense it or reduce the quantity of air in the volume of balestock material.

This pre-packing or compaction combined with the action of the ram 166 allows for more material to be moved through and handled by the material handling system for balers 100. Hydraulic cylinder 164 pushes hydraulic cylinder shaft 165 which is attached to ram 166 to move balestock material received from auger 162 and move it out system output 105. Hydraulic cylinder 164 is mounted to housing 104 and provides the movement indicated by the arrows on a continuous basis during operation.

The balestock material received from augers 162 is received in discharge area 190, and ram 166 pushes the balestock material through discharge area outlet 190a. As more material passes through and is pushed through discharge area outlet 190a, it pushes the balestock through system output 1055 and into the baler input 119a of the baler 119.

The system output chute 105 can place or deliver balestock material into baler 119 in any one of a number of different ways but all within the contemplation of this invention, such as from the side as shown, or from the top.

As can be seen the material handling system for balers is very similar to the shredding system, absent the shredder. It also may or may not include the feed drum 141, depending on the application, all within the contemplation of this invention.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A mobile shredding system, comprising:

(a) an input hopper with a hopper inlet and a hopper outlet, the hopper disposed to receive feedstock to be shredded;

(b) a first [conveyer] *conveyor* with a first conveyor inlet and a first conveyor outlet, the first conveyor inlet disposed to receive feedstock from the hopper outlet;

(c) a shredder feed aperture disposed to receive feedstock from the first conveyor outlet;

(d) a second conveyor with a second conveyor inlet disposed to receive excess feedstock from the first conveyor outlet, the second conveyor having a conveyor surface moving away from the shredder feed aperture, wherein the second conveyor moves excess feedstock away from the shredder feed aperture; and (e) a shredder disposed too receive feedstock from the feed aperture, the shredder having a shredder inlet and a shredder outlet.

2. A mobile shredding system as recited in claim 1, and which further comprises:

a shredded material compactor disposed to receive shredded material from the shredder outlet, the shredded material compactor having a compactor outlet;

a reciprocating ram, with a stroke of the reciprocating ram defining a discharge area, the discharge area disposed to receive shredded stock from the shredded material compactor, the discharge area having an outlet.

3. A mobile shredding system as recited in claim 2, and wherein the compactor is one or more augers.

4. A mobile shredding system as recited in claim 1, and which further comprises a shredder feed drum rotatably mounted between the shredder feed aperture and the shredder, wherein rotation of the shredder feed drum pulls feedstock from the feed aperture and pushes it toward the shredder.

5. A mobile shredding system as recited in claim 1, and wherein the first conveyor is in a substantially horizontal orientation.

6. A mobile shredding system as recited in claim 1, and wherein the second conveyor is in a substantially vertical orientation.

*7. A shredded system, comprising:*

*(a) an input hopper with a hopper inlet and a hopper outlet, the hopper disposed to receive feedstock to be shredded;*

*(b) a first conveyor with a first conveyor inlet and a first conveyor outlet, the first conveyor inlet disposed to receive feedstock from the hopper outlet;*

*(c) a shredder feed aperture disposed to receive feedstock from the first conveyor outlet;*

*(d) a second conveyor with a second conveyor inlet disposed to receive excess feedstock from the first conveyor outlet, the second conveyor having a conveyor surface moving away from the shredder feed aperture, wherein the second conveyor moves excess feedstock away from the shredder feed aperture; and*

*(e) a shredder disposed to receive feedstock from the feed aperture, the shredder having a shredder inlet and a shredder outlet.*

*8. A shredding system as recited in claim 7, and which further comprises:*

*a shredded material compactor disposed to receive shredded material from the shredder outlet, the shredded material compactor having a compactor outlet;*

*a reciprocating ram, with a stroke of the reciprocating ram defining a discharge area, the discharge area disposed to receive shredded stock from the shredded material compactor, the discharge area having an outlet.*

*9. A shredding system as recited in claim 8, and wherein the compactor is one or more augers.*

*10. A shredding system as recited in claim 7, and which further comprises a shredder feed drum rotatably mounted between the shredder feed aperture and the shredder, wherein rotation of the shredder feed drum pulls feedstock from the feed aperture and pushes it toward the shredder.*

*11. A shredding system as recited in claim 7, and wherein the first conveyor is in a substantially horizontal orientation.*

*12. A shredding system as recited in claim 7, and wherein the second conveyor is in a substantially vertical orientation.*

*13. A feedstock feed system, comprising:*

*(a) an input hopper with a hopper inlet and a hopper outlet, the hopper disposed to receive feedstock;*

*(b) a first conveyor with a first conveyor inlet and a first conveyor outlet, the first conveyor inlet disposed to receive feedstock from the hopper outlet;*

*(c) a feed aperture disposed to receive feedstock from the first conveyor outlet; and*

*(d) a second conveyor with a second conveyor inlet disposed to receive excess feedstock from the first conveyor outlet, the second conveyor having a conveyor surface moving away from the feed aperture, wherein the second conveyor moves excess feedstock away from the feed aperture;*

*a shredder disposed to receive feedstock from the feed aperture, the shredder having a shredder inlet and a shredder outlet; and*

*wherein the first conveyor is a belt conveyor.*

*14. A feedstock feed system as recited in claim 13, and which further comprises:*

*a shredded material compactor disposed to receive shredded material from a shredder outlet, the shredded material compactor having a compactor outlet;*

*a reciprocating ram, with a stroke of the reciprocating ram defining a discharge area, the discharge area disposed to receive shredded stock from the shredded material compactor, the discharge area having an outlet.*

*15. A feedstock feed system as recited in claim 14, and wherein the compactor is one or more augers.*

*16. A feedstock feed system as recited in claim 13, and which further comprises a shredder feed drum rotatably mounted between a shredder feed aperture and a shredder, wherein rotation of the shredder feed drum pulls feedstock from the feed aperture and pushes it toward the shredder.*

* * * * *